No. 815,164.　　　　　　　　　　　　PATENTED MAR. 13, 1906.
W. E. HAYNER.
HALTER.
APPLICATION FILED JUNE 24, 1904.

Witnesses
C. N. Davies
M. E. Moore

William E. Hayner
Inventor
by Wm. N. Moore
Attorney

UNITED STATES PATENT OFFICE.

WILLIAM E. HAYNER, OF SPRINGBORO, OHIO.

HALTER.

No. 815,164.      Specification of Letters Patent.      Patented March 13, 1906.

Application filed June 24, 1904. Serial No. 213,967.

*To all whom it may concern:*

Be it known that I, WILLIAM E. HAYNER, a citizen of the United States, residing at Springboro, in the county of Warren and State of Ohio, have invented certain new and useful Improvements in Halters, of which the following is a specification.

My invention is an improved halter and hitching-strap; and the object of my invention is the provision of a device of this character which can be easily applied and detached and which will perform its functions as a halter or hitching-strap in a thorough and perfect manner and which will be inexpensive and entirely practical in every particular.

With this object in view my invention consists of a halter and hitching-strap embodying novel feature of construction and combinations of parts, substantially as disclosed herein.

Figure 1:
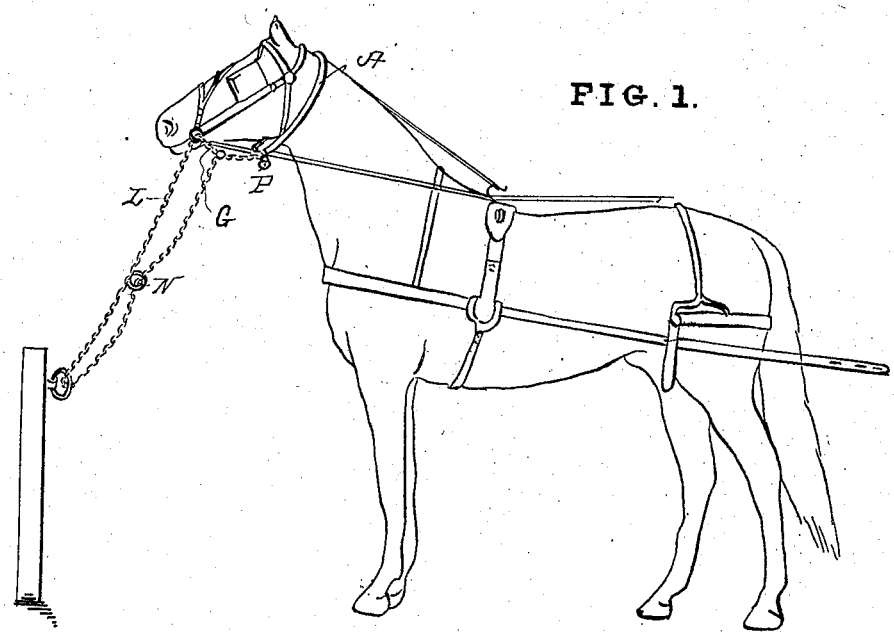
Figure 2:
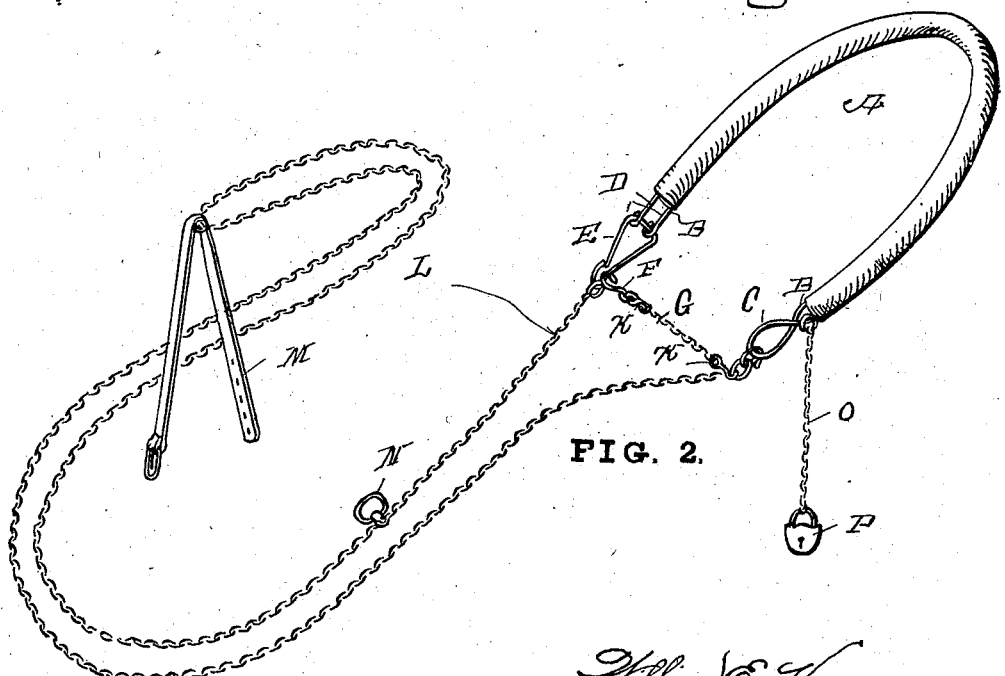

Figure 1 represents a view of a horse with my halter and hitching-strap applied in operative position, and Fig. 2 represents a perspective view, on an enlarged scale, of the device detached.

My combined halter and hitching-strap comprises the leather bail or strap A, which passes around the neck of the animal adjacent to the head and which forms a cover for the chain B, one end of the chain being formed with an eye C and the other end being formed with the hooks D, and to the hooks is attached the snap or spring hook E, and to eye or loop is attached the hook and link F, said link and snap-hook being connected by the short chain G, carrying at each end the attaching-hooks K. From this construction it will be seen that the strap fits around the neck of the animal near the head and that the short chain connects the strap and prevents accidental detachment, and to the snap-hook and link is connected the chain L, the end of which is connected to the strap M, which strap may be used to attach the halter to a hitching-post when an eye, as shown in Fig. 1, is absent. One section of the attaching-chain carries the guide-loop N, through which the other section or strand of the attaching-chain passes.

When the device is in use, the strap is connected to the bridle and the attaching-chain passes through the loop on the hitching-post, as shown in Fig. 1, and in order to lock the device and prevent the loop from removal from the attaching-chain I use the short chain O, which carries the padlock P, which padlock connects the link E and hook F when the device is in use and prevents the horse from being detached.

From the foregoing description, taken in connection with the drawings, it is evident that I provide a halter and hitching-strap which is entirely efficient and practical in every respect and which can be produced at a very small price, rendering the invention useful and desirable.

I claim—

A halter and hitching-strap, consisting of a soft or flexible covering or neck-strap of tubular form, a chain inclosed in said tubular strap and having a double loop at one end, and a pair of parallel arms each formed with a hooked end at the other end of said chain, the short chain carrying a lock and connected to the upper loop of said double loop, the angular-shaped snap-hook engaging the hooked ends of said parallel arms, the pair of links connected together, the upper one engaging the lower loop of said double loop, the short transverse chain provided with a hook at each end adapted to engage the snap-hook and lower link for securing the neck-strap snugly under the head of the animal, the hitching-chain having its ends connected to said snap-hook and the lower link of said double links, and the guide-ring connected to one side of the hitching-chain and adapted to receive the other side of said hitching-chain.

In testimony whereof I affix my signature in presence of two witnesses.

WILLIAM E. HAYNER.

Witnesses:
W. H. SIEGFRIED,
FRANK M. FOX.